US012609869B2

(12) United States Patent
Di Cairano-Gilfedder et al.

(10) Patent No.: US 12,609,869 B2
(45) Date of Patent: Apr. 21, 2026

(54) METHOD AND SYSTEM FOR CONTROLLING A COMPUTING SYSTEM

(71) Applicant: BRITISH TELECOMMUNICATIONS PUBLIC LIMITED COMPANY, London (GB)

(72) Inventors: Carla Di Cairano-Gilfedder, London (GB); Anthony Conway, London (GB)

(73) Assignee: BRITISH TELECOMMUNICATIONS PUBLIC LIMITED COMPANY, London (GB)

( * ) Notice: Subject to any disclaimer, the term of this patent is extended or adjusted under 35 U.S.C. 154(b) by 62 days.

(21) Appl. No.: 18/857,581

(22) PCT Filed: Apr. 13, 2023

(86) PCT No.: PCT/EP2023/059651
§ 371 (c)(1),
(2) Date: Oct. 17, 2024

(87) PCT Pub. No.: WO2023/208594
PCT Pub. Date: Nov. 2, 2023

(65) Prior Publication Data
US 2025/0247300 A1    Jul. 31, 2025

(30) Foreign Application Priority Data

Apr. 29, 2022    (EP) ..................................... 22170758
Apr. 29, 2022    (GB) ..................................... 2206279

(51) Int. Cl.
*H04L 41/40*        (2022.01)
*H04L 41/0816*      (2022.01)
(Continued)

(52) U.S. Cl.
CPC ........ *H04L 41/145* (2013.01); *H04L 41/0816* (2013.01); *H04L 41/0823* (2013.01); *H04L 41/16* (2013.01)

(58) Field of Classification Search
CPC ............... H04L 41/145; H04L 41/0816; H04L 41/0823; H04L 41/16
See application file for complete search history.

(56) References Cited

U.S. PATENT DOCUMENTS

2020/0103894 A1    4/2020    Cella et al.
2021/0119881 A1    4/2021    Shirazipour et al.
(Continued)

FOREIGN PATENT DOCUMENTS

CN        111381515 A        7/2020
CN        112859789 A        5/2021
CN        112888268 B        8/2022

OTHER PUBLICATIONS

Gartner Top 10 Strategic Technology Trends for 2020, Insights Information Technology Article, Contributor: Kasey Panetta, Oct. 21, 2019 (11 pages).
(Continued)

*Primary Examiner* — Jude Jean Gilles
(74) *Attorney, Agent, or Firm* — Nixon & Vanderhye P.C.

(57)    ABSTRACT

A digital twin system controls a computing system and comprises a digital twin comprising a virtual model of the computing system including hardware and software entities and their environment. The virtual model incorporates three-dimensional physical dimensions of the hardware and emulates the behaviour of the computing system. The digital twin system performs communications with the computing system including receipt of real-time information regarding performance of the computing system and sensed conditions of the computing system and its environment. The digital twin system comprises a machine learning system trained on
(Continued)

Digital Twin System 120

AI Model 122

Orchestrator 124

Digital Twin 126

130

142A  142B  142C 142D  142E  142F 142G  142H  142J

Software-Defined Network 140

100

(i) historical and real-time performance data; and (ii) historical and real-time sensed data of the computing system and its environment. The digital twin system comprises an orchestrator that determines an action for the computing system and its environment and that supports selected system management objective(s). The orchestrator transmits a command to the computing system to perform the action.

20 Claims, 7 Drawing Sheets

(51) Int. Cl.
| | |
|---|---|
| H04L 41/0823 | (2022.01) |
| H04L 41/14 | (2022.01) |
| H04L 41/16 | (2022.01) |

(56) References Cited

U.S. PATENT DOCUMENTS

| | | | |
|---|---|---|---|
| 2021/0201084 A1 | 7/2021 | Woo et al. | |
| 2021/0357555 A1 | 11/2021 | Liu et al. | |
| 2024/0428077 A1* | 12/2024 | Jiang | G06N 3/045 |

OTHER PUBLICATIONS

Wikipedia, "Network function virtualization", edited Jun. 22, 2021 (10 pages).

Wikipedia, "Software-defined networking", edited Jul. 20, 2021 (15 pages).

International Preliminary Report on Patentability dated Nov. 7, 2024, issued for International Application No. PCT/EP2023/059651 (15 pages).

Combined Search and Examination Report for GB2206279.8, dated Oct. 10, 2022, 7 pages.

Extended European Search Report for EP22170758.1, dated Oct. 11, 2022, 17 pages.

International Search Report and Written Opinion of the ISA for PCT/EP2023/059651, mailed Jun. 29, 2023, 23 pages.

Author unknown, "Specification of the Infrastructure Virtualisation, Management and Orchestration—Interim", T-NOVA, Sep. 30, 2014, Grant Agreement No. 619520, 193 pages.

Guosheng Zhu et al., "Draft Recommendation ITU-T Y.IMT2020-qos-fa QoS functional architecture for the IMT-2020 networks", Telecommunication Standardization Sector, International Telecommunication Union, Study Period 2017-2020, SG13-TD323/WP1, Study Group 13, Victoria Falls, Mar. 4-14, 2019, 12 pages.

* cited by examiner

310 Create Virtual Representation in Digital Twin

320 Gather historical and real-time operational data and static data

330 Develop AI model for system management

Development 300A

340 Use AI model and digital twin to control operation of network

Production 300B

311 Create virtual representation of hardware entities, data flows and their interactions 312 Create virtual representation of clusters of the hardware entities 313 Create virtual representation of environment Create virtual representation 300A 710 Select one or more system management objectives 720 Perform bi-directional communications between the digital twin system and the computing system 730 Determine, by an orchestrator, at least one action for the computing system 740 Transmit a command over the bidirectional link to the computing system to perform the action.

METHOD AND SYSTEM FOR CONTROLLING A COMPUTING SYSTEM

CROSS-REFERENCE TO RELATED APPLICATIONS

This application is the U.S. national phase of International Application No. PCT/EP2023/059651 filed Apr. 13, 2023, which designated the U.S. and claims priority to EP 22170758.1 filed Apr. 29, 2022, and GB 2206279.8 filed Apr. 29, 2022, the entire contents of each of which are hereby incorporated by reference.

FIELD

The present application relates to a method and system for controlling a computing system such as a software-defined network.

BACKGROUND

Computing systems, which are considered herein to encompass facilities supporting data processing, data communication, data storage, and/or software resources, may be provided at various infrastructure sites. For present purposes, an infrastructure site can be regarded as a facility at a particular geographical location providing computing, communications and/or storage resources for many users, typically hundreds, thousands, or more, who may be located at a wide variety of locations. For example, large server farms may provide data processing by running large-scale applications, such as hosting major web-sites; data communication may be provided by various forms of network, including wired and wireless links, software-defined networks (SDNs), telephone exchanges and so on; data storage may be provided by storage area networks; and software functions may be provided such as firewall or wide area network (WAN) acceleration. Computing systems may be designed specifically to provide one particular type of service, such as computing, communications or storage, or a combination of two or more such service types.

A typical infrastructure site may include a computing system having multiple cabinets, each cabinet providing a set of racks; each rack is usually designed to accommodate a rack unit having a fixed form factor; and each rack unit generally incorporates one or more boards. A rack unit typically provides power and communications support to the boards located in the rack unit, while a cabinet provides power and communications support to the rack units located in the cabinet. Different elements in the data system may focus on different tasks, for example, some boards/rack units/cabinets may primarily perform data processing, while other boards/rack units/cabinets may primarily perform data communications (including the control of such communications) or storage. The infrastructure site, and the computer systems therein, have access to one or more communications networks for interacting with external users (humans) and other systems, such as remote data centres, other computing platforms, and systems being managed by the infrastructure site (networks, monitoring systems, industrial control systems, etc).

It is now common for data systems to use virtualisation, in which a virtualisation layer is interposed between the hardware and the software (applications, communications etc.) running on top of the software. For example, for data communications the virtualisation layer may define a set of one or more virtual local area networks (VLANs) which communicate data over one or more real (physical) networks. For computing, the virtualisation layer may define a set of one or more virtual machines which run applications and other software tasks, with the virtual machines then running on top of one or more physical machines.

One reason for virtualisation is to allow different users to be allocated their own (virtual) resources over shared physical resources, with the virtualisation layer maintaining security between the different users. Virtualisation also supports more flexible resource allocation, because a virtual resource (for processing, communication, etc.) with relatively low requirements may be implemented on just a portion of a physical device, with the other portions of the physical device being available to assign to other virtual users. Conversely, a virtual resource with relatively high requirements may be implemented across multiple physical devices, but appear to the (virtual) user as a single resource.

An important metric for a data centre is the performance and availability of a service. For example, if part of an infrastructure site goes down, then the services provided by that part of the infrastructure site are no longer available to users—this is 100% loss of service for all affected users. There are various ways in which performance and/or availability may be impacted. For example, if a communications link to a given destination fails, then users that rely on that communications link may experience a 100% loss of service, however, the infrastructure site may still be able to provide full service to other users who do not rely upon that communications link. Similarly, if the infrastructure site includes some hardware or software for performing a particular task or application, and that hardware or software fails, then all users may experience a partial loss of service—they can no longer perform this particular task or application, but other applications provided by the infrastructure site may still be operational as normal.

It is a well-known practice to provide redundant hardware and software to mitigate against service loss. For example, a service may be provided by a primary hardware device, but tracked by a secondary device. If the primary hardware device fails, the service may be transferred to the secondary device. This is sometimes referred to as failover, and ideally is performed in a manner which is transparent to the end user. The use of virtualisation offers further flexibility for handling failures within an infrastructure site. For example, if particular hardware or software within the infrastructure site fails, then the virtual devices implemented by this hardware may be redeployed onto one or more other hardware or software systems that are still operational. Again, this redeployment may be (largely) transparent to the end user.

Even if the availability of a service is generally maintained through use of some additional software or hardware, the performance of that service may be degraded. For example, if there is a reduction in the available physical processing or communication resources in the infrastructure site, the remaining resources may find it difficult to maintain the overall performance level of the infrastructure site. The reduction of available physical resources may then be experienced by users as delays (latency) in their interactions with the infrastructure site. If these delays are severe, the service performance may be significantly degraded—this is especially significant with respect to real-time services, such as data communications, for example voice communications, streaming of content for gaming, television, and so on.

Availability and performance therefore represent key metrics in running an infrastructure site. In many cases, the operator of an infrastructure site agrees certain quality of service (QoS) levels with clients regarding performance and availability. If the QoS levels provided do not (fully) meet the agreed levels, the operator may, for example, incur reduced revenue or compensation claims. It is therefore important for operators to run infrastructure sites so as to provide the expected QoS, including performance and availability. Additionally, there may be other specified system management objectives for running an infrastructure site, such as minimising power consumption. Accordingly, an operator may have to manage a complex infrastructure site so as to accommodate different (and potentially multiple) system management objectives.

SUMMARY

A digital twin system is provided herein for controlling a computing system including multiple hardware and software entities. The digital twin system comprises: a virtual model of the computing system including the multiple hardware and software entities and their environment. The virtual model incorporates three-dimensional physical dimensions of the hardware entities, the virtual model being configured to emulate the behaviour of the computing system. The digital twin system further comprises a communications interface for performing bi-directional communications with the computing system. The communications include receipt of real-time information regarding performance of the computing system and sensed conditions of the computing system and its environment. The digital twin system also comprises a machine learning system trained on (i) historical and real-time performance data; (ii) historical and real-time sensed data for the computing system and its environment. The digital twin system further comprises an orchestrator configured to use the digital twin and the trained machine learning system in conjunction with the received real-time performance data and sensed data for the computing system and its environment to determine at least one action for the computing system and its environment that supports one or more selected system management objectives. The orchestrator is further configured to transmit a command over the bi-directional link to the computing system to perform the at least one action.

Typically, the one or more system management objectives relate to physical parameters and/or performance characteristics of operating the computing system.

A corresponding method and computer program for operating a digital twin system such as described above are also disclosed herein.

BRIEF DESCRIPTION OF THE FIGURES

Various implementations of the claimed invention will now be described by way of example only with reference to the following drawings.

DETAILED DESCRIPTION

Figure 1:
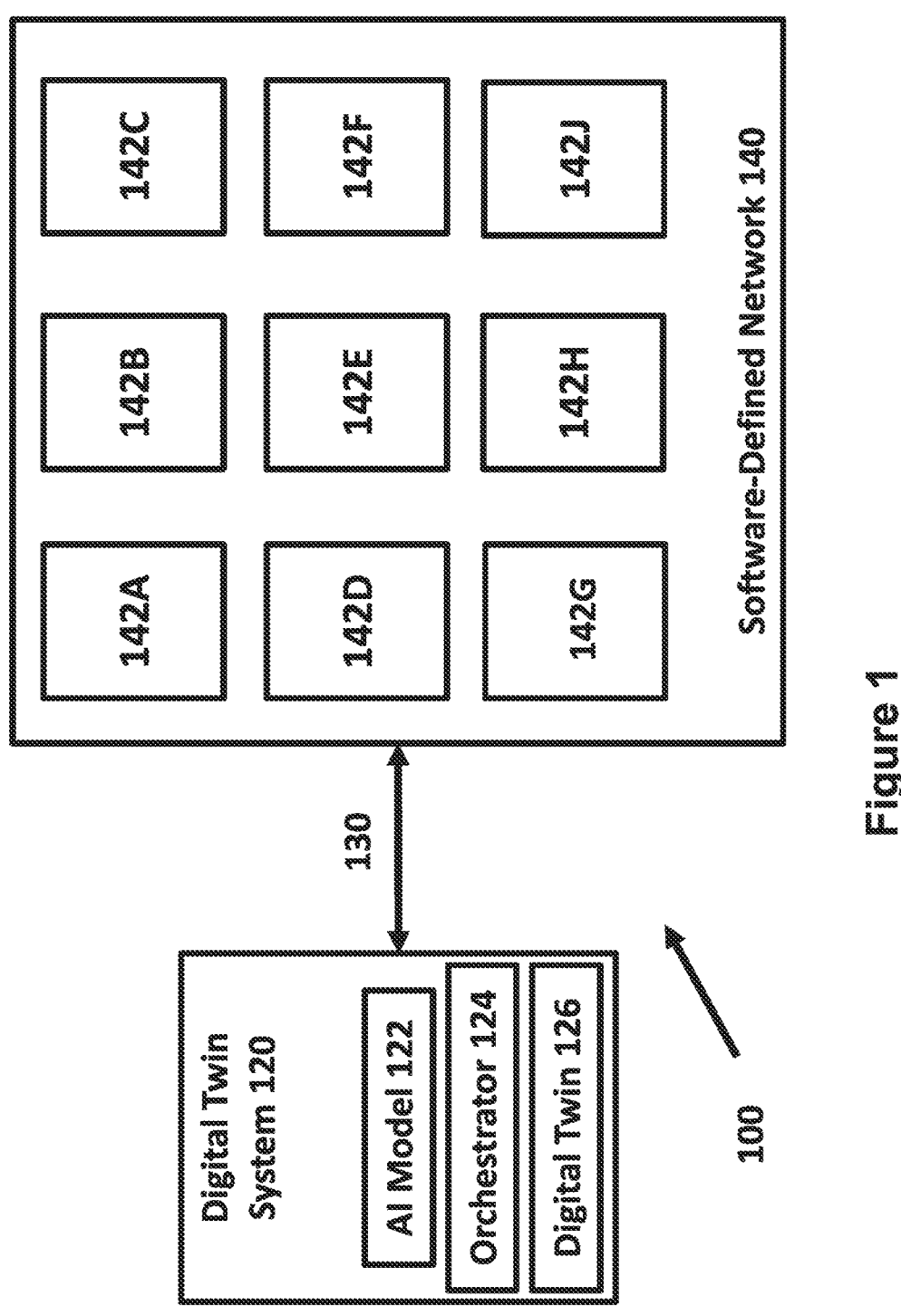
FIG. 1 is a schematic diagram of a digital twin being used to control operations of a computing system, namely a software-defined network, operating over an infrastructure site in accordance with the present disclosure.

FIG. 1 is a schematic diagram of an infrastructure site 100 including a digital twin system 120 which is used to control operations of a computing system, namely a software-defined network (SDN) 140, in accordance with the present disclosure. The computing system includes multiple cabinets 142A-142J (collectively 142) which contain computing (including communication) resources. The cabinets 142A-142J may all contain the same computing resources, or they may contain various computing resources, different from one another, depending upon the needs of any given implementation. In addition, the cabinets 142 may primarily provide the control plane of the software-defined network, with the data plane and associated hardware communications links potentially extending out from the data centre (not shown in FIG. 1). The infrastructure site 100 in FIG. 1 is an example of a computing system that may be controlled by the digital twin system 120, however, the digital twin system 120 may be used to control other forms of computing system, such as server farms or telephone exchanges.

A bi-directional communications link 130 is provided between the digital twin system 120 and the software-defined network 140. This bi-directional communications link, which may be implemented as one or more physical wired and/or wireless connections, may be used by the digital twin system 120 to receive state information from the software-defined network 140 and to send control instructions back to the software-defined network 140 (both as described in more detail below). The digital twin system 120 may be co-located with the software-defined network 140, but it is also possible for at least part of the digital twin system 120 to be located remotely from the software-defined network 140, for example in the cloud. In the latter case, the communications link 130 may, for example, be implemented using a wide area network or other suitable communications facility which provides a good real-time data connection.

The digital twin system 120 includes a virtual representation or model that serves as the real-time digital counterpart (twin) 126 of a physical object or process (see https://en.wikipedia.org/wiki/Digital_twin); in other words, a digital twin 126 may provide a digital representation of a real-world (physical) entity. It is a virtual representation of the real entity, and therefore allows the behaviour of the real-world entity to be simulated and analysed in parallel to the real-world operation of the real-world entity. Note that this parallel running of both the real-world entity and the digital twin 126 thereof distinguishes a digital twin from more traditional simulation or modelling. The use of digital twins has been adopted by various industries such as manufacturing, car racing, and aerospace.

In the example of FIG. 1, digital twin system 120 includes a digital twin 126 of the software-defined network 140 of the infrastructure site 100, in other words, the digital twin 126 provides a virtual representation which serves as the real-time digital counterpart of the software-defined network 140. Accordingly, the digital twin 126 is a real-time evolving digital duplication of the software-defined network 140, while the digital twin system 120 incorporates not only the digital twin 126 itself, but also additional components as described below. The digital twin system 120 includes significant real-time data collection, analysis and inference, and utilises the communications link 130 to provide a real-time bi-directional connection between (inter alia) the digital twin system 126 and its physical twin (software-defined network 140). This real-time bi-directional connection between the digital twin 126 and its physical twin takes the digital twin 126 beyond a conventional simulation system (which typically does not have such a real-time link between a simulation model and a physical realisation of the model and does not take account of spatial features of the computing system and its environment as disclosed herein).

A digital twin configuration is sometimes regarded as having three pillars: a digital pillar comprising the digital twin itself 126; a physical pillar which represents the physical system (twin), here the software-defined network 140 corresponding to the digital twin 126; and a connection pillar, namely the communications link(s) 130, to provide real-time bi-directional connectivity. The digital twin system 120 shown in FIG. 1 can be regarded as an extended version of the digital pillar. In particular, the digital twin system 120 of FIG. 1 shows the digital twin system 120 including the digital twin 126 itself, and plus an artificial intelligence (AI) model 122 and an orchestrator 124. These additional components are generally considered herein as part of the digital pillar, in that they are used (as described in more detail below) in conjunction with the digital twin 126 but are not directly representative of the physical twin itself.

The orchestrator 124 is a form of control program for the digital twin system 120. For example, it may execute recurring tasks on the digital twin 126, and implement dependencies and interactions between the tasks. The artificial intelligence (AI) model 122 may be implemented using any suitable form of machine-learning (ML), for example, a neural network comprising a network of nodes linked by connections (synapses), the connections having associated weights to control the forward propagation of an input signal through the neural network. Training (machine learning) typically involves providing input data having known outcomes which can be compared with the outcome from the neural network (or other ML system). Based on this comparison, the weights of various connections may be adjusted to better align the known outcomes with the outcomes produced by passing the input data through the AI (ML) system.

In some cases, the software-defined network 140 may implement network-functions virtualisation (NFV)—see https://en.wikipedia.org/wiki/Network_function_virtualization, which is typically built on a virtualization layer as discussed above. Thus network functions virtualisation may entail the virtualisation of entire classes of network node functions and software into building blocks that may connect, or chain together, to create and deliver communication services. By way of example, a virtualized network function (VNF) may be implemented within one or more virtual machines or containers running different software and communication processes on top of high-volume, off-the-shelf servers, switches and storage devices, or even cloud computing infrastructure (rather than having custom hardware appliances for each network function).

The combination of software defined networking and network function virtualisation provides a network architecture paradigm that uses information technology and related technologies to enable network and service providers to flexibly instantiate network links and network functions and services by means of configurable software, allowing virtual networks and virtual machines to be instantiated on-demand. It allows increased flexibility, efficiency, and scalability of networks and services while at the same time providing substantial cost savings.

Figure 2:
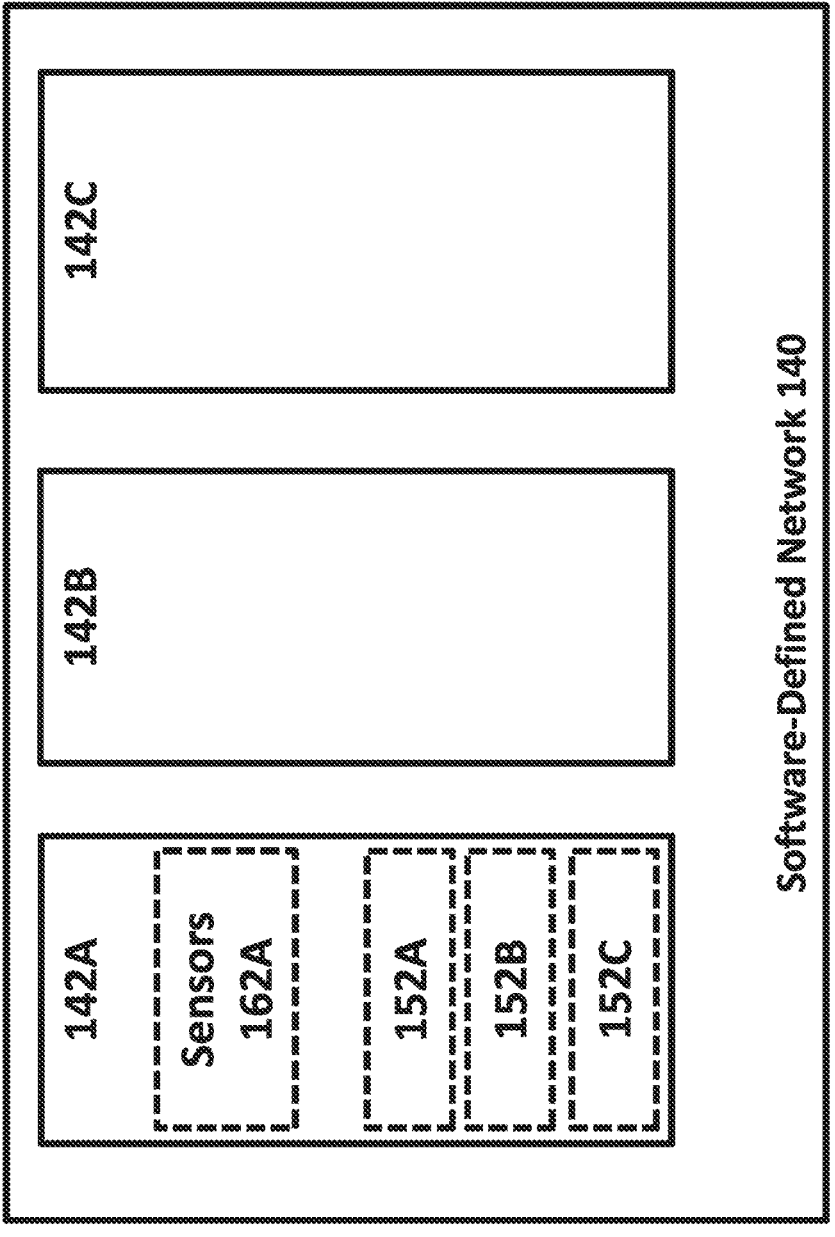
FIG. 2 is a schematic diagram showing in more detail the software-defined network operating over an infrastructure site of FIG. 1 in accordance with the present disclosure.

FIG. 2 is a schematic diagram showing in more detail a portion of the software-defined network of FIG. 1 in accordance with the present disclosure. In particular, FIG. 2 shows cabinets 142A-142C (the remaining cabinets 142D-142J being omitted for clarity). FIG. 2 further shows certain components of cabinet 142A, namely sensors 162A and processing devices 152A, 152B, 152C (rack units). Cabinets 142B and 142C will generally have similar components to cabinet 142A, likewise for cabinets 142D-142J (again, such components are omitted from FIG. 2 for clarity). The processing devices 152A-152C (collectively 152) generally contain one or more boards to perform the functionality of the software-defined network 140. As is well-known, the cabinets 142 can be reconfigured as desired by changing boards and/or processing devices (rack units) 152 within and between cabinets 142.

The one or more sensors 162A are used to measure one or more physical parameters relating to the components of the cabinet 142A. Note that although the sensors 162A are shown in FIG. 2 as located above the rack units 152A-152C, the sensors (referred to collectively as 162) may be distributed in any desired manner on the cabinets 142 and/or on the rack units and processing boards and/or within the infrastructure site (e.g. mounted on the walls or ceiling). The sensors 162 may be used to measure one or more physical parameters relating to the components within the cabinets 142 and/or the surrounding environment. By way of example, and without limitation, the sensors may be used to measure temperature (of air and/or various components of the data centre 100), humidity, vibration or other movement, airflow, electrical voltage, electrical current, light levels, and/or water ingress. In some cases, the sensors can be regarded as part of the "Internet of Things" (IoT), a paradigm in which very small/simple devices are network-enabled for communications over the Internet and/or other networks (such as to report temperature readings).

In this context, the physical nature of the parameters monitored by the sensors 162 can be distinguished from parameters that are internal to the software processing performed by the computing resources within the cabinets 142. The latter for example might track the number of bytes that have been communicated to other devices, the number of active users, and so on.

Returning to FIG. 1, this shows a single digital twin 126 corresponding to the software-defined network 140. In some implementations, this single digital twin 126 may be implemented as a set or ensemble of two or more digital twins. This implementation using multiple digital twins may be arranged in a hierarchical fashion to match the structure of the software-defined network 140. For example, the digital twin 126 may comprise a digital twin for each respective cabinet 142; and in some cases, the digital twin for a cabinet may comprise a digital twin for each respective rack unit 152; and so on down the hierarchy. Other implementations in which digital twin 126 is formed from multiple component digital twins may be based on functionality. For example, each cabinet 142 may be provided with one rack unit primarily to provide communications and one or more rack units primarily to provide processing (computational) resources. In such a case, the digital twin 126 might be implemented as one digital twin to represent the set of communications rack units across all cabinets 142 and another digital twin to represent the processing rack units across all cabinets. It will be appreciated that these different configurations for digital twin 126 within the digital twin system 120 are described by way of example and many variations are possible, including hybrid arrangements based partly on hierarchy and partly on functionality.

Although FIG. 1 shows a single bi-directional link 130 between the digital twin system 120 and the software-defined network 140, in some implementation the bi-directional link may comprise two or more different network connections. For example, the digital twin system 120 (including the components thereof) might communicate with a sensor 162 using a wireless protocol, such as Bluetooth or wireless local area network (WLAN). In contrast, the digital twin system 120 (including the components thereof) might communicate with the software-defined network 140 using more of a server-based communication facility, such as fibre-channel or Ethernet.

The approach described herein, for example using the configuration shown in FIG. 1, supports the operation of the orchestrator 124 of the digital twin system 120 to provide automated, real-time management of the software defined network 140. Alternatively, the digital twin system 120 may be used to monitor and control some other form of data centre (rather than a software-defined network). In both cases, the digital twin system controls the operation of physical resources for computing, communications and the like.

As mentioned above, the software-defined network 140 may support network functions virtualization (NFV). In this case, the digital twin system 120 provides commands at the virtual level, and the virtualisation layer gives effect to these commands at the physical layer. The outcome is still that the digital twin system 120 has controlled the physical resources and components of the software-defined network 140, albeit indirectly via the virtualisation layer.

The operation of the digital twin system 120 may involve responding to various events, such as a rise in temperature in one cabinet 142. The orchestrator 124 may use the AI model 122 to propose potential outcomes and/or possible interventions. For example, a possible outcome might be a partial or complete failure of a rack unit 152 within the cabinet 142 because of the high temperature. A potential intervention might be to increase air conditioning in the infrastructure site 100, or to swap some or all processing from the cabinet with rising temperature to another, cooler, cabinet.

The orchestrator 124 may use the digital twin 126 to assess potential interventions and their resulting effects. For example, the digital twin system 126 can be used to model the effect of increasing the rate of air conditioning, and/or transferring workload from one cabinet to another. The orchestrator 124 can then assess the potential interventions and their resulting effects against specified system management objectives (as described in more detail below) to select the one or more interventions which handle the event (such as rising temperature) best with respect to the specified system management objectives. Based on this assessment and selection, the digital twin system 120, in particular, orchestrator 124 thereof, may send one or more instructions or commands to the software-defined network 140 over communications link 130 to control deployment and operation of resources of the software-defined network 140, such as network links, IT resources and virtual functions.

In some implementations, the software-defined network 140 may have its own orchestrator (not shown in FIGS. 1 and 2). The commands from the orchestrator 124 of the digital twin system 120 may therefore be directed at the orchestrator of the software-defined network 140 for implementation within the software-defined network. In other cases, the commands from the orchestrator 124 of the digital twin system 120 may be sent directly for implementation by the software-defined network 140, without the latter having its own orchestrator. It will be apparent that variations and/or hybrids of these two approaches may also be used to implement the commands or instructions from the digital twin system 120 as received by the software-defined network.

As described above, the orchestrator 124 of the digital twin system 120 operates in real-time, utilising information obtained by using the digital twin 126 to model the operation and behaviour of the software-defined network 140 (including network functions virtualisation if enabled). The digital twin system 120 incorporates software algorithms (such as provided by the AI system 122) for learning the operation and behaviour of the software-defined network 140 and for using the insight provided by such learning to perform management and control operations with respect to the software-defined network 140, such as the instantiation of virtual functions and network elements.

Accordingly, the approach described herein allows the orchestrator 124 of the digital twin system 120 to manage physical resources of the software-defined network 140 corresponding to the digital twin 126. For example, the orchestrator may predict expected demand for services (using the AI model 122) and based on these expected demands, the orchestrator 124 transmits appropriate control instructions to the software-defined network 140 regarding the deployment and release of network links, IT resources and virtual functions (if SDN 140 is NFV-enabled) from a common pool of resources available to deliver services with given objectives (such as QoS parameters, etc).

In this approach, the orchestrator 124 and digital twin system 120 provide fully automated and policy-driven functionality for controlling the software-defined network 140, such as by instantiating and/or releasing network resources and functions as appropriate. The policies or system management objectives used by the orchestrator 124 to control the software-defined network 140 may include functionality to provide resilience and quality assurance and to mitigate or neutralise the impact of failures or service deterioration.

The above functionality may be derived from historical operational data of the software-defined network 140, including information from sensors 162, in combination with real-time operational data from the software-defined network 140, including information from sensors 162, and a real-time global view maintained by the digital twin 126 of its operational status (including the operational status of resources associated with the digital twin). In addition, static information on equipment, e.g. from manufacturer factsheets, may also be utilised. The orchestrator 124 combines these different sources of information to model and analyse real-time of the software-defined network 140, typically by utilising AI model 122. In response to this analysis, together with any appropriate simulation or modelling performed using the digital twin 126, the orchestrator 124 is able to predict functions and/or physical resources that need to be instantiated or re-deployed within the software-defined network 140, for example to prevent service degradation or to implement disaster recovery.

Figure 3:
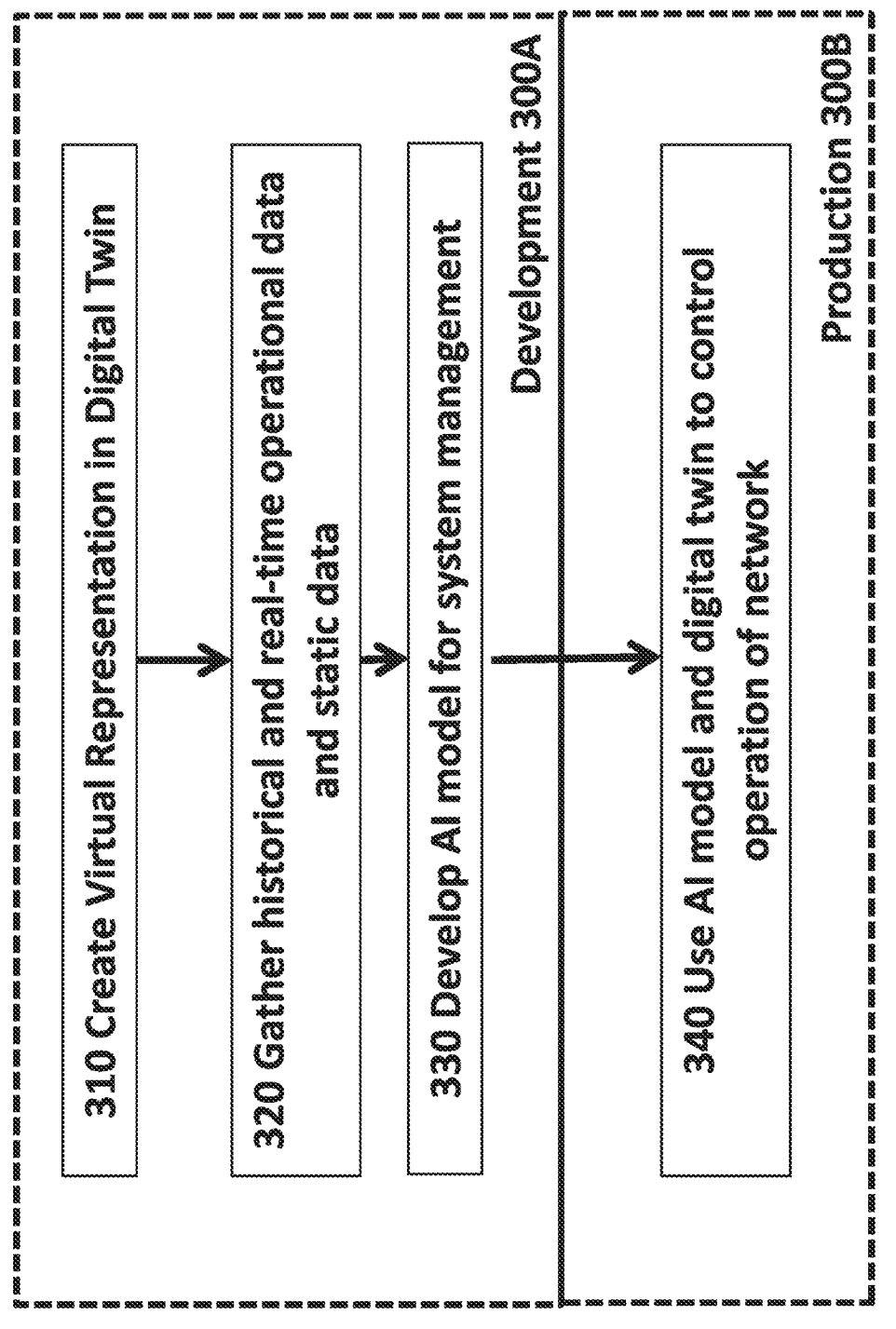
FIG. 3 is a schematic flowchart showing an overview of an example of a method for creating and using the digital twin of FIG. 1 in accordance with the present disclosure.

FIG. 3 is a schematic flowchart showing an overview of an example of a method for creating and using the digital twin of FIG. 1 in accordance with the present disclosure. The method of FIG. 3 comprises two phases. The first phase is a development phase 300A and the second phase is a production phase 300B. The development phase 300A is typically performed once to create and train the digital twin system 120, including the orchestrator 124 and AI model 122. At this point, the digital twin system 120, including the orchestrator 124 and AI model 122 are now ready for productive use in being entrusted with the real-time control of a live software-development network 140. Although FIG. 3 shows a clear demarcation between the development phase 300A and the production phase 300B, the AI system 122 may continue being trained during the production phase 300B (as described in more detail below). For example, during operation of the production phase 300B, further operational data is being acquired, and this operational data may be utilised to update the AI model 122 incorporated into the digital twin system 120, and therefore to update the behaviour of the digital twin system 120 itself.

Figure 4:
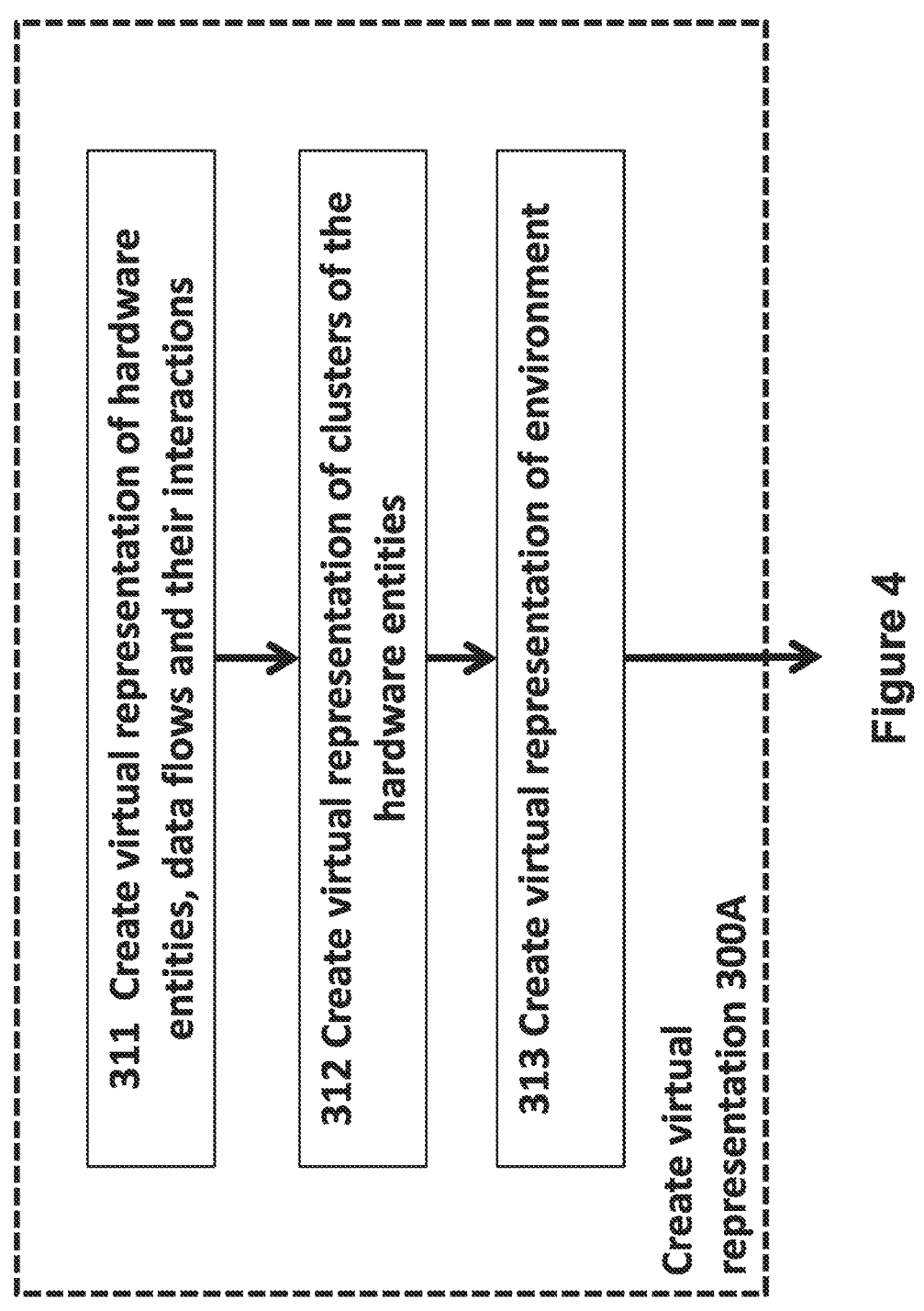
FIG. 4 is a schematic flowchart showing in more detail the creation of the digital twin using the example method of FIG. 3 in accordance with the present disclosure.

The method of FIG. 3 commences with operation 310 which comprises creating a virtual representation of the software-defined network 140 which forms the basis of the digital twin 126. FIG. 4 is a schematic flowchart showing in more detail the creation of the digital twin 126 as per operation 310 in FIG. 3. In particular, the example implementation of FIG. 4 begins with operation 311 to create a three-dimensional virtual model or representation of the physical (hardware) entities in the software-defined network 140 together with data flows and their interactions and environment. In this context, the model is virtual in the sense that it is created as part of the digital twin 126, but it is modelling or representing physical aspects of the hardware entities, such as physical dimensions of the hardware, structure, interconnections, and so on and their environment.

The virtual model for the digital twin 126 may represent hardware entities such as cabinets, rack units, processing boards, routers, servers, communications links, etc. The model may go down to a desired level of granularity according to the particular implementation. For example, the model may include rack-mounted units, and may extend down to lower level components, such as processing cards within rack-mounted units 152, and may extend in some cases further down again to components on processing cards (such as chipsets, memory, network interfaces, etc). As another example, the three-dimensional representation may model individual line cards within a router.

The method now progresses to operation 312 to create a three-dimensional virtual model or representation of clusters (or other assemblages) of the entities modelled in operation 311 and the interactions between these entities and their environment. Again, the model is virtual in the sense that it is created as part of the digital twin 126, but it is modelling or representing physical aspects of the hardware entities and their environment. The clusters being modelled within the software-defined network 140 may comprise systems such as a telephone exchange, a telephone exchange rack, a data-centre branch, a data-centre rack and so on. In some cases, a cluster of entities may occupy part or all of one cabinet 142; in other cases, a cluster may include entities which are spread across two or more cabinets.

The method now progresses to operation 313 to create a three-dimensional virtual model or representation of the environment in which the clusters of operation 312 are physically located. Again, the model is virtual in the sense that it is created as part of the digital twin 120, but it is modelling or representing physical aspects of the environment. The virtual model of the environment may incorporate parameters which are measured (sensed) by sensors 162 and are physical properties of the indoor (and/or potentially outdoor) environment such as temperature and/or humidity. The model may also include more static data relating to the environment, such as weather predictions and/or flooding risks.

It will be appreciated that the processing of FIG. 4 represents one way of using a hierarchical approach to create the digital twin 126 including a complete virtual model for the software-defined network 140. It will be appreciated that this particular method is provided by way of illustration, and other approaches may be adopted according to the circumstances of any given implementation. For example, the virtual representations may be created at least in part based on functional considerations (in contrast to hierarchical-based modelling). In one such implementation, one virtual model might be created of data server systems (from processing cards up to cabinets 142), and another virtual model might be created of communications devices (again from processing cards up to cabinets 142). These two virtual models may then be combined to model the software-designed network 140. Accordingly, it will be appreciated that there are various methods or approaches available according to the circumstances to create a final virtual representation of the software-ware designed network 140 including the relevant environment for incorporation into the digital twin 126.

Returning to FIG. 3, we now progress to operation 320, which involves collecting or gathering historical and real-time information regarding the software-defined network 140 and the use thereof. For example, the following parameters (at least) might be gathered for a given software-defined network:

(i) historical and real-time network performance data (e.g. utilisation, loss, delay, service failure). Note that such information is typically available from monitoring or reporting software within the software-defined network 140 itself.

(ii) historical and real-time sensed physical information about hardware entities in the software-defined network and its environment, this information generally being obtained by sensors 162 and including information such as the temperatures of server systems included within the software-defined network 140.

(iii) historic, current (real-time) and forecast demand levels on the software-defined network 140. Note that historic and current demand levels can typically be obtained directly from the software-defined network 140 itself (see (i) above).

(iv) static information on equipment (e.g. manufacturer factsheets) or environment, such as a building information model (BIM)—see https://en.wikipedia.org/wiki/Building_information_modeling or weather patterns and/or flooding risks.

A forecast demand level may be determined, for example, using the AI model 122 as described in more detail below.

Figure 5:
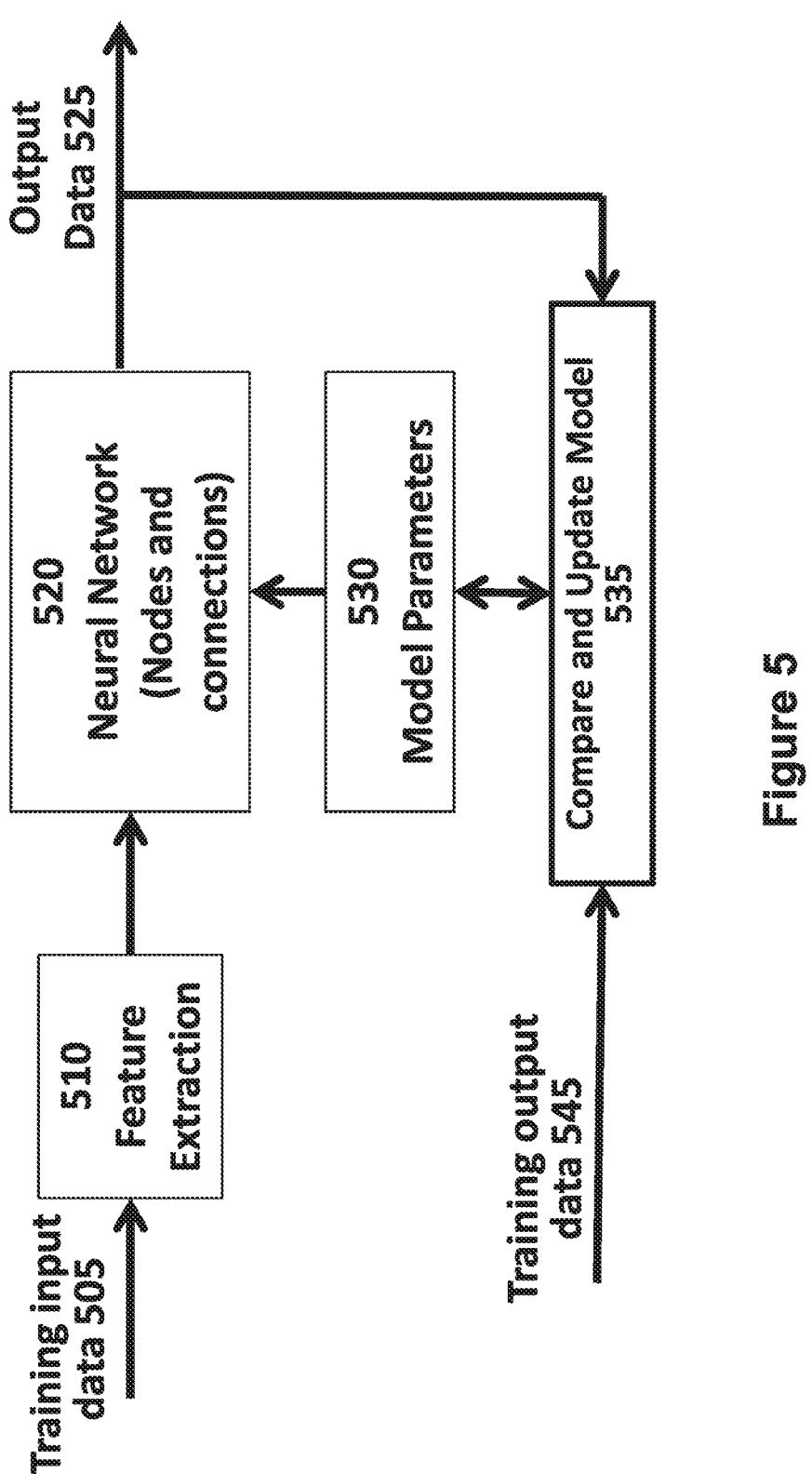
FIG. 5 is a schematic diagram illustrating an example of training an AI model in a development phase in the method of FIG. 3 in accordance with the present disclosure.

The method of FIG. 3 now progresses to operation 330, in which an AI model 122 is developed to assist with system management of the software-defined network 140. FIG. 5 is a schematic diagram illustrating an example of a first, development, phase of training an AI model at operation 330 in the method of FIG. 3 in accordance with the present disclosure. In this development phase, training input data 505 is provided, and also training output data 545. The training output data 545 represents the correct or preferred output from the AI model in response to the training input data 505.

In FIG. 5, it is assumed that the AI model is, for example, in the form of a neural network 520 comprising a set of interconnected nodes typically having a layered arrangement. An input signal propagates through the neural network (NN) model from a NN input layer to a NN output layer. The signal propagation over a connection from one NN node to another node is determined by a weight: the greater the weight, the stronger the signal propagation over this connection. The weights are specified as a set of model parameters 530. For a fixed set of nodes, the model is fully defined by these weights or parameters.

The training input data 505 is passed through a feature extraction unit 510, for example with standard techniques such as principal component analysis (PCA), which derives useful predictive features or particular properties or metrics (features) from the input data 505, typically properties such as a mean value, slope of input (increasing or decreasing), some measure of variance, and so on. The resulting set of features as derived from the input data is passed as an input signal from the feature extraction unit 510 into the neural network 520. The signal then propagates through the neural network 520 in accordance with the weights (model parameters 530) associated with the neural network 520.

During the development phase of training the AI model 122, the input training data 505 passes through the feature extraction unit 510 and the neural network 520 as discussed above to provide output data 525. The intention is that this output data 525 will match the training output data 545. Accordingly, a compare and update unit 535 compares the training output data 545 as supplied for training against the output data 525 produced by the neural network, and the difference identified by this comparison is used as feedback to update the model parameters 530 to better align the training output data 545 with the output data 525. This leads to an iterative optimisation procedure as more additional training input data 505 is passed through the neural network to provide additional output data 525 for comparison with training output data 545 to allow further refinement of the model parameters 530 and to further align the training output data 545 with the output data 525 to produce a trained AI model 122.

Figure 6:
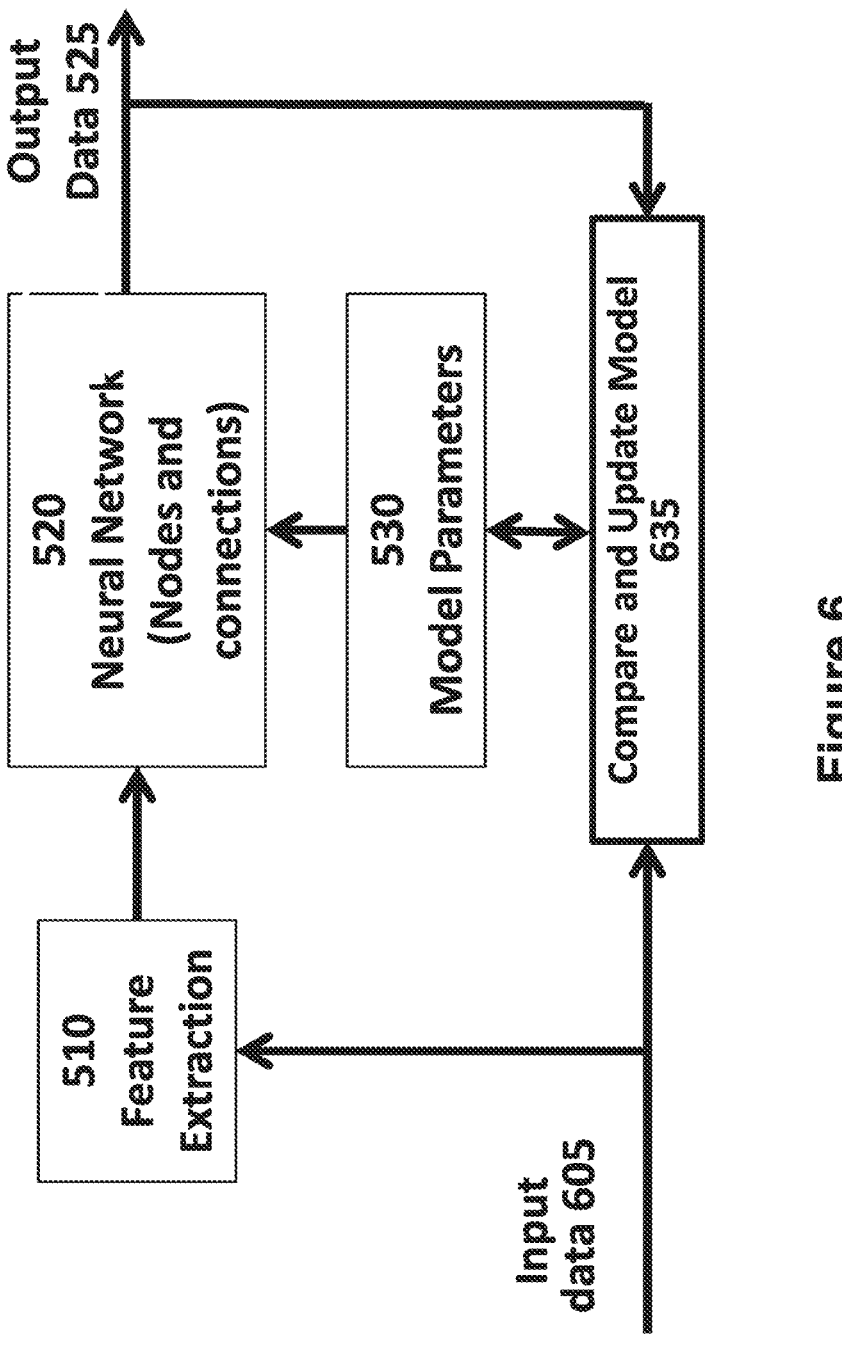
FIG. 6 is a schematic diagram illustrating an example of training the AI model in an adaptation phase in accordance with the present disclosure.

FIG. 6 is a schematic diagram illustrating an example of a second phase providing adaptation of the AI model 122 in accordance with the present disclosure. Whereas the training of the AI model 122 illustrated in FIG. 5 is part of the development phase 300A shown in FIG. 3, the adaptation phase of training the AI model illustrated in FIG. 6 is part of the production phase 300B shown in FIG. 3. Note that this adaptation phase of training the AI model 122 illustrated in FIG. 6 is not shown in FIG. 3. In addition, an element shown in FIG. 6 with the same reference numeral as a corresponding element in FIG. 5 indicates that these two corresponding elements generally have the same purpose and operation as each other.

In FIG. 6, the input data 605 passes through the feature extraction unit 510 for propagation through the neural network 520 to produce output data 525 in accordance with the set of model parameters 530. This is substantially the same procedure as described above with respect to FIG. 5, except that in FIG. 5 the input data comprises specific training data 505, whereas in FIG. 6 the input data 605 generally represents live production data—for example, as acquired in real-time from sensors 162 or some other portion of the software-defined network 140.

The process of FIG. 6 for updating the model parameters 530 differs from that shown in FIG. 5 as in the adaption phase of FIG. 6, there is no training output data 545 for comparison with the output data 525 from the neural network. However, in FIG. 6 the output data 525 can be compared against subsequent input data 605 if they both relate to similar or dependent metrics. For example, the input data 605 may represent a temperature, and the AI model 122 may (inter alia) produce as output a predicted future temperature (e.g. a potential temperature rise). This output can then be compared, such as shown in FIG. 6, with subsequent input data 605 to see whether or not the predicted rise in temperature occurs in the subsequent input data. The information about whether or not the predicted output matches the subsequent input data can then be used as feedback by the compare and update unit 535 to update the model parameters 530 accordingly, with the intention that going forwards, predicted output 525 from the neural network 520 will match more closely what is observed in subsequent input data 605.

For example, assume some input data 605 is received at time In(t=T0) and some corresponding output data 525 is produced by the neural network 520 Out(t=T0) (where propagation delay through the neural network is ignored for simplicity). At some time later (T1; T1>T0), further input data 625 is received In(t=T1). A comparison of Out(t=T0) against In(t=T1) (in effect, predicted against subsequently observed data respectively) provides a way of detecting an inaccuracy of the neural network 520, and hence supports updating the model parameters 530 to try and reduce this inaccuracy for subsequent predictions in similar circumstances.

It will be appreciated that FIGS. 5 and 6 show example implementations for the AI model 122 but many other implementations are possible. For example, FIGS. 5 and 6 are based on neural networks, but there are many known variations of a standard neural network, and also other AI models or machine learning systems that are not based on neural networks (e.g. they may use support vector machines instead). Accordingly, the AI model 122 can be implemented using any appropriate AI or machine learning (ML) or deep learning technology.

It will also be appreciated that although the AI system 122 is shown in FIGS. 5 and 6 as receiving training in both a development phase and then an adaptation phase, some implementations may use only one of these phases. Also, in some cases the training, typically the processing associated with updating the weights or parameters of the AI model, may be performed offline, especially during the production phase 300B. Such off-line processing may reduce the real-time computational burden on the digital twin system 120, and/or may also support testing of an updated AI model 122 prior to the updated model going live in a production system 300B.

In the particular context of the digital twin system 120, the training of the AI model is based on the following inputs: the digital twin 126 created in operation 310 of FIG. 3 (see also steps 311, 312 and 313 of FIG. 4); and the historical and real-time information regarding the software-defined network 140 gathered at operation 320 of FIG. 3, namely: (a) historical and real-time network performance data (e.g. utilisation, loss, delay, service failure); (b) historical and real-time sensed physical information about hardware entities in the software-defined network and its environment; and (c) historic, current (real-time) and forecast demand levels on the software-defined network 140, (d) static information on equipment (e.g. manufacturer factsheets) or environment, e.g. a BIM model and/or weather predictions and/or flooding risks.

Based on the above inputs, the orchestrator 124 of the digital twin system 120 is able to gain (near) real-time insight by modelling the operations of the software-defined network 140. This insight may be captured in the AI model 122 and can cover various aspects of the operation and functionality of the software-defined network, such as the following:

(i) attributes of the hardware entities and their environment which are most relevant for satisfying one or more selected system management objectives (as discussed in more detail below). The digital twin 126 supports such learning because it can be used to test directly a range of different interventions, for example by simulation. Such interventions may modify one or more properties of the software-defined network as modelled in the digital twin 126—for example, the modifications may include changes in configuration, deployment, instantiation, settings, and so on. Note that testing such interventions in the virtual domain of the digital twin 126 may be quicker, more flexible and more powerful than testing in the physical domain, for example, because the software-defined network itself may be required for on-going productive use, and hence not available for testing purposes. Furthermore, it may be desired to test the software-defined network 140 with a wide range of input communications, demand levels, and so on. If such testing is performed in the physical domain, it may be complex and difficult to supply all the relevant input signals to the software-defined network for testing purposes, however, such input signals may be generated more readily in the virtual domain of the digital twin 126.

(ii) the optimal level of granularity for the three-dimensional model of hardware entities with associated software created in operation 311 of FIG. 4. A digital twin 126 typically consumes and generates large volumes of data, and hence the digital twin system 120 must be provided with appropriate levels of computing (including communications) resources. The learning process can help to mitigate this situation by determining the level of detail needed for successful implementation of the digital twin 126—for example, whether the digital twin 126 needs to model just at the granularity level of rack units 152, or whether there should also be modelling at the level of processor boards within the rack units, and whether there should further be modelling at the level of chip sets and other components on a processor board. Note that this choice of granularity may be conditional on context, such as the current state or configuration of the software-defined network and/or the environmental conditions; this dynamic behaviour is described in more detail below.

(iii) the optimal clustering of hardware entities with associated software for the three-dimensional model of clusters created in operation 312 of FIG. 4. The learning process can help to determine the clustering of the hardware entities from (ii) above. For example, a row of cabinets 142 might be defined as a cluster in the digital twin 126, or alternatively all the cabinets 142 might all be treated separately in the digital twin 126, without any clustering. The choice of optimal clustering is one that best reflects physical behaviour of the software-defined network 140 for operating the software-defined network 140 in a manner that satisfies the selected system management objective(s). Again, the choice of clustering may be determined on a dynamic basis, as described in more detail below.

(iv) operational interventions that can be applied to the software-defined network 140. Interventions (such as changes to the configuration of the software-defined network) can be applied to the digital twin 126 in the virtual domain to understand the impact of such interventions on the operation of the software-defined network 140, for example by means of simulation. The AI system 122 is therefore able to learn policies such as relating to instantiation and/or (re)configuration of hardware entities in the software-defined network 140 which support the system management objective(s). As noted above, testing such interventions in the virtual domain of the digital twin 126 may be quicker, more flexible and more powerful than testing in the physical domain, for example, because the software-defined network itself may be required for on-going productive use, and hence not available for testing purposes. Furthermore, it may be desired to test the software-defined network 140 with a wide range of input communications, demand levels, and so on that are not easily replicated in the physical domain.

As an example of the learning in operation 330, if the temperature of a server (or other hardware entity) exceeds a particular temperature threshold, then from historical data and past outcomes, the AI model 122 may learn a policy that this overheating of the server can sometimes lead to service impairments. The learned policy may prescribe to check the load and performance of the server over time, and also to check the temperature of its environment and of other devices (with a size of granularity/clustering learned in (ii) and (iii) above), as well as checking a service/demand forecast for that server. Depending on the content of the data being checked (such as load and performance data, plus the temperature of associated hardware entities) the policy may further require the activation of an alternative (or additional) cooling system in the relevant cluster to resolve the overheating.

In other circumstances, the overheating may be addressed in a different manner. For example, if the environmental temperature for other devices (hardware entities) in the same cluster as the overheating server is still relatively low, the policy may prescribe to instantiate appropriate functions on alternative devices running in the same cluster as the overheating server to allow workload/demand to be diverted from the overheating server onto these alternative devices (servers). With this diversion in place, the demand on the overheating server is reduced (or potentially removed altogether), which firstly can help the server to cool, and secondly can help to avoid any disruption to service should the overheating server be about to fail. A spatial three-dimensional view of the cluster, maintained by the digital twin 126, may be used to assist in the choice of one or more alternative devices.

The discrimination of which policy to follow (in the above case, increase cooling or transfer demand to other servers—or possibly a combination of both) may be performed in the AI model 122 (or potentially in the orchestrator 124) having regard to:

(a) particular details of the current state of the software-defined network 140, such as transmitted over the bi-directional link 130 and/or such as obtained from the digital twin 126 (potentially by simulating the different proposed interventions); and (b) one or more user-defined system management objectives selected, for example, from the following list:
maximisation of quality of service
maximisation of resources utilisation minimisation of failure risk minimisation of operational cost or a combination of them using a weighted function Note that the operational cost may be based on at least one physical parameter, such as power consumption of the data centre 100, including both power consumption directly by the computing/communication resources as well as environmental power consumption (such as for air conditioning); storage demand; and/or consumption of processing power.

In the above example, the option of increasing air conditioning may lead to a significant rise in power consumption (a physical resource), and hence operational cost. Accordingly, in general, the AI model 122 may prescribe diverting demand from the overheating server to other servers to satisfy a system management objective of minimising operational cost. However, if the other servers are already highly loaded, then diverting additional demand to these other servers from the overheating server may degrade the performance of these other servers, for example by increasing latency, as they struggle to process the increased workload. Such a situation might therefore lead to a breach of another system management objective, namely maximisation of quality of service, and so in this situation, the AI model 122 may prescribe increasing the air conditioning rather than diverting demand away from the overheating server.

Returning to FIG. 3, after training of the AI model 330 for use in the digital twin system 120, the development phase 330A is completed, and the digital twin system 120 is ready for the production phase 300B. Note that as mentioned above, training (adaptation) of the AI model 330 may continue during the production phase 300B (as illustrated in FIG. 6).

Operation 340 is performed during the production phase, whereby the digital twin system 120, in particular the orchestrator 124, uses the AI model 122 and the digital twin 126 to control operation of the software-defined network 140. For example, such control may dynamically trigger instantiation and/or (re)configuration of the software defined network 140 and associated infrastructure of the infrastructure site 100—such as to increase air conditioning and/or to divert demand from an overheating server (as discussed above).

As another example of operation 340, for most system management objectives, it may be appropriate for the digital twin to model the physical domain at the level of the rack units 152. However, if a rack unit 152 in a cabinet 142 fails, possibly due to a problem with the internal power supply provided by the cabinet, it may be appropriate to then monitor the remaining hardware entities in this cabinet at the level of the processor boards (and communication boards, etc) to see if they show any instability in power level. Therefore the granularity for operating the digital twin 126 may be adjusted dynamically based on the current state of the digital twin 126, the current state of its physical counterpart the software-defined network 140, and/or current or predicted environmental conditions.

This dynamic operation may support high levels of granularity when specifically needed for managing the software-defined network by the digital twin system 120, for example in the presence of certain error conditions. Such a high level of granularity typically provides the best level of knowledge for avoiding further (or increasing) error conditions, and hence for maintaining operational service levels within the software-defined network 140 corresponding to a system management objective of ensuring quality of service. However, lower levels of granularity incurring lower overhead may be acceptable in more routine conditions and this can then reduce the data handling and processing requirements of the digital twin system 120, corresponding to a system management objective of minimising cost.

Adjusting the granularity in the digital twin 126 represents an intervention with respect to the digital twin 126, but not necessarily with respect to the system-defined network 140. However, the latter may be impacted, for example, if the increased granularity requires additional performance data to be returned from the software-defined network 140 to the digital twin system 120 in order to provide more detailed monitoring data. In such a case, a command may be sent from the digital twin system 120 to the software-defined network to instruct the latter to provide the additional data to the former over the communications link 130.

Figure 7:
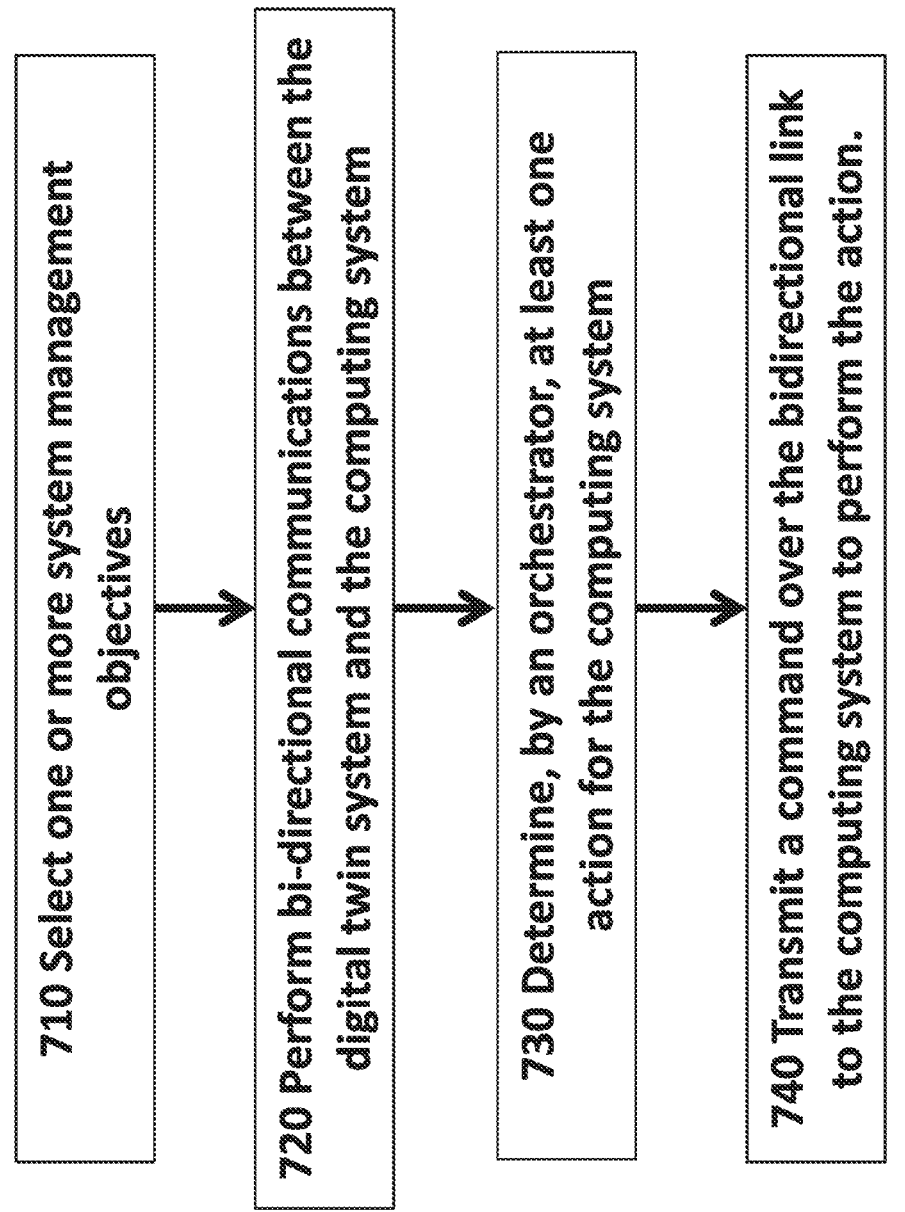
FIG. 7 is a schematic flowchart showing an example of a method for operating a digital twin system in accordance with the present disclosure.

FIG. 7 is a schematic flowchart showing an example of a method for operating a digital twin system in accordance with the present disclosure. The method involves using a digital twin system to control a computing system including multiple hardware and software entities. In some cases the computing system may form part of an infrastructure site 100, such as a data centre or telephone exchange. In some cases the computing centre may implement a software-defined network 140 which may, for example, support network functions virtualisation. The digital twin system 120 includes a digital twin 126 comprising a virtual model of the computing system including multiple hardware entities such as servers, cabinets, rack systems, routers, and so on and associated software. The virtual model incorporates three-dimensional physical dimensions (and relative locations) of the hardware entities. The virtual model is configured to emulate the behaviour of the computing system.

At operation 710, one or more system management objectives relating to physical parameters and/or performance characteristics of operating the computing system may be selected. Such objectives may include, for example, the computing system supporting a given quality of service (QoS). Note that this selection of system management objectives may be performed separately from the other operations in FIG. 7, for example, the selection may in some cases be made at the time of installation rather than during productive use.

At operation 720, bi-directional communications are performed between the digital twin system 126 and the computing system. The communications generally include receipt of real-time information regarding performance of the computing system and sensed environmental conditions of the computing system. The sensed environmental conditions may include parameters such as temperature, humidity, a measure of vibration or other mechanical disturbance, and so on.

At operation 730, an orchestrator (part of the digital twin system 120) determines at least one action for the computing system, the action supporting the selected system management objective(s). The action is determined using the digital twin and a machine learning system (AI model 122) in conjunction with the received real-time performance data and sensed environmental data. The machine learning (artificial intelligence) system has been trained on: (i) historical and real-time performance data; and (ii) historical and real-time sensed environmental data for the computing system and its environment. In some cases, the ML system may further be trained on static information on equipment (e.g. manufacturer factsheets) or environment, such as a building information model (BIM) and/or weather patterns and/or flooding risks.

At operation 740, a command is transmitted over the bi-directional link to the computing system to perform the at least one action.

The operations of the digital twin system described herein and the other components of the data centre may be implemented using one or more general purpose computer systems, each such computer system typically comprising hardware to provide a processing capability, such as one or more central processing units (CPUs) and/or one or more graphical processing units (GPUs), and also some form of memory, such as random access memory (RAM) and/or flash memory. The digital twin system is generally implemented as software, namely one or more computer programs each comprising a set of program instructions which may be loaded into the memory for execution by the processing capability. It would also be possible to implement at least a portion of the digital twin system in hardware, for example, by using an application specific integrated circuit (ASIC). The software for implementing the digital twin may be stored and/or distributed on a non-transitory medium, such as a hard disk drive, a USV stick, an optical storage disk, tape storage, flash memory, and so on.

In conclusion, while various implementations and examples have been described herein, they are provided by way of illustration, and many potential modifications will be apparent to the skilled person having regard to the specifics of any given implementation. Accordingly, the scope of the present case should be determined from the appended claims.

The invention claimed is:

1. A digital twin system for controlling a computing system including multiple hardware and software entities, the digital twin system comprising:

a digital twin comprising a virtual model of the computing system including the multiple hardware and software entities, the virtual model incorporating three-dimensional physical dimensions of the hardware entities and their environment, the virtual model being configured to emulate the behaviour of the computing system;

a communications interface for performing bi-directional communications with the computing system, the communications including receipt of real-time information regarding performance of the computing system and sensed conditions of the computing system and its environment;

a machine learning system trained on (i) historical and real-time performance data; and (ii) historical and real-time sensed data of the computing system and its environment;

an orchestrator configured to use the digital twin and the trained machine learning system in conjunction with the received real-time performance data and sensed data for the computing system and its environment to determine at least one action for the computing system and its environment that supports one or more selected system management objectives, and to transmit a command over the bi-directional link to the computing system to perform the at least one action.

2. The digital twin system of claim 1, wherein the one or more system management objectives are selected from:

maximisation of quality of service maximisation of resources utilisation minimisation of failure risk minimisation of operational cost or a combination of them using a weighted function.

3. The digital twin system of claim 1, wherein the machine learning system is configured to receive adaptation training during production use of the digital twin system for controlling the computing system.

4. The digital twin system of claim 1, wherein the virtual model determines a granularity of hardware and associated software entities for incorporating into the virtual model.

5. The digital twin system of claim 4, wherein the granularity is determined subject to a machine learning process, and optionally wherein the granularity is dynamically updated during production use of the digital twin system for controlling the computing system.

6. The digital twin system of claim 1, wherein the virtual model determines a clustering of hardware entities for incorporating into the virtual model.

7. The digital twin system of claim 6, wherein the clustering is determined subject to a machine learning process, and optionally wherein the clustering is dynamically updated during production use of the digital twin system for controlling the computing system.

8. The digital twin system of claim 1, wherein the historical and real-time performance data comprises at least one of utilisation, loss, delay and service failure.

9. The digital twin system of claim 1, wherein the historical and real-time sensed environmental conditions of the computing system comprise at least temperature of one or more of the hardware entities.

10. The digital twin system of claim 1, wherein the ML system is further trained on static information relating to the computing system and/or the environment.

11. The digital twin system of claim 1, wherein the orchestrator is configured to simulate potential interventions on the digital twin to assess such interventions in relation to the system management objectives.

12. The digital twin system of claim 1, wherein the orchestrator is configured to redeploy services from a first hardware or software entity in a cluster to a second hardware or software entity in the cluster, the orchestrator being further configured to use a spatial three-dimensional view of the cluster, maintained by the digital twin, to assist in the choice of the second hardware or software entity.

13. The digital twin system of claim 1, wherein the computing system is a software-defined network and/or wherein the computing system includes a virtualisation layer above the hardware entities, and wherein the orchestrator is configured to instantiate and deploy virtual resources using the virtualisation layer.

14. A method for using a digital twin system to control a computing system including multiple hardware and software entities, the digital twin system including a digital twin comprising a virtual model of the computing system including the multiple hardware and software entities, the virtual model incorporating three-dimensional physical dimensions of the hardware entities and their environment, the virtual model being configured to emulate the behaviour of the computing system, wherein the method comprises:

performing bi-directional communications between the digital twin system and the computing system, the communications including receipt of real-time information regarding performance of the computing system and sensed conditions of the computing system and its environment;

determining, by an orchestrator, at least one action for the computing system that supports one or more selected system management objectives, wherein the at least one action is determined using the digital twin and a machine learning system, in conjunction with the received real-time performance data and sensed conditions of the computer system and its environment, wherein the machine learning system is trained on: (i) historical and real-time performance data; and (ii) historical and real-time sensed data for the computing system and its environment;

and transmitting a command over the bi-directional link to the computing system to perform the at least one action.

15. A non-transitory computer-readable storage medium storing a computer program comprising software instructions that when executed on a processor of a computing device cause the computing device to perform the method of claim 14.

16. The method of claim 14, further comprising receiving adaptation training during production use of the digital twin system for controlling the computing system.

17. The method of claim 14, further comprising:

determining a granularity of hardware and associated software entities for incorporating into the virtual model; and wherein the granularity is determined subject to a machine learning process, and the granularity is dynamically updated during production use of the digital twin system for controlling the computing system.

18. The method of claim 14, further comprising:

determining a clustering of hardware entities for incorporating into the virtual model; and wherein the clustering is determined subject to a machine learning process, and the clustering is dynamically updated during production use of the digital twin system for controlling the computing system.

19. The method of claim 14, wherein the historical and real-time sensed environmental conditions of the computing system comprise at least temperature of one or more of the hardware entities.

20. The method of claim 14, further comprising:

redeploying services from a first hardware or software entity in a cluster to a second hardware or software entity in the cluster, and using a spatial three-dimensional view of the cluster, maintained by the digital twin, to assist in the choice of the second hardware or software entity.

* * * * *